United States Patent
Hwang et al.

(10) Patent No.: US 9,602,770 B2
(45) Date of Patent: Mar. 21, 2017

(54) METHOD AND SYSTEM FOR SUPPORTING VIDEOCONFERENCE IN DISTRIBUTED TELEPRESENCE PLATFORM

(71) Applicant: Electronics and Telecommunications Research Institute, Daejeon (KR)

(72) Inventors: In Ki Hwang, Daejeon (KR); Do Young Kim, Daejeon (KR); Yeong Jin Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/669,227

(22) Filed: Mar. 26, 2015

(65) Prior Publication Data
US 2015/0288925 A1 Oct. 8, 2015

(30) Foreign Application Priority Data
Apr. 4, 2014 (KR) .................. 10-2014-0040538

(51) Int. Cl.
*H04N 7/15* (2006.01)
*H04L 29/06* (2006.01)

(52) U.S. Cl.
CPC ......... *H04N 7/152* (2013.01); *H04L 65/1066* (2013.01); *H04L 65/403* (2013.01)

(58) Field of Classification Search
CPC combination set(s) only.
See application file for complete search history.

(56) References Cited

U.S. PATENT DOCUMENTS

| | | | |
|---|---|---|---|
| 7,187,923 B2 | 3/2007 | Mousseau et al. | |
| 7,986,665 B2 | 7/2011 | Kezys et al. | |
| 2001/0009014 A1* | 7/2001 | Savage, III | H04L 29/06027 709/204 |
| 2005/0159153 A1* | 7/2005 | Mousseau | H04W 36/0066 455/432.1 |
| 2008/0266383 A1* | 10/2008 | Shah | H04L 12/1818 348/14.09 |
| 2011/0255512 A1 | 10/2011 | Lee et al. | |
| 2011/0314165 A1* | 12/2011 | Maes | H04L 65/1066 709/227 |
| 2012/0182383 A1* | 7/2012 | Kee | H04N 21/242 348/14.08 |
| 2013/0210401 A1 | 8/2013 | Knaz et al. | |
| 2015/0271447 A1* | 9/2015 | Glass | H04N 7/147 348/14.09 |
| 2015/0365457 A1* | 12/2015 | Dvir | H04L 65/608 709/219 |

FOREIGN PATENT DOCUMENTS

| | | |
|---|---|---|
| KR | 1020150011886 A | 2/2015 |
| WO | 02054820 A2 | 7/2002 |

* cited by examiner

*Primary Examiner* — Joseph J Nguyen
*Assistant Examiner* — Phung-Hoang J. Nguyen
(74) *Attorney, Agent, or Firm* — William Park & Associates Ltd.

(57) ABSTRACT

Provided is a method of supporting a videoconference between clients through a plurality of media servers under the control of a management server. The method includes requesting a client change, from a first client connected to a first media server, to a second client to be connected to a second media server; generating a mirror session for the second client according to the request for the client change; and stopping a session for the first client.

13 Claims, 5 Drawing Sheets

METHOD AND SYSTEM FOR SUPPORTING VIDEOCONFERENCE IN DISTRIBUTED TELEPRESENCE PLATFORM

CROSS-REFERENCE TO RELATED APPLICATIONS

This U.S. non-provisional patent application claims priority under 35 U.S.C. §119 of Korean Patent Application No. 10-2014-0040538, filed on Apr. 4, 2014, the entire contents of which are hereby incorporated by reference.

BACKGROUND OF THE INVENTION

The present invention disclosed herein relates to a method of supporting a videoconference, and more particularly, to a distributed telepresence platform based handover method.

In a typical telepresence platform, a person who has wanted to attend a conference has attended the conference by using one client (such as a wire or wireless terminal) and has attended the conference through the same client until the conference ends. If a conference attendee has attended the conference by using a wireless client at first but then wants to change the terminal to a wire client during the conference due to a defect in picture or sound quality, there is inconvenience in that he or she should log off the conference and newly log in by using the wire client. Thus, finding a method of seamlessly providing a conference has become a critical issue.

SUMMARY OF THE INVENTION

The present invention provides a handover method for performing a videoconference seamlessly during the videoconference in a distributed telepresence platform.

Embodiments of the present invention provide methods of supporting a videoconference between clients through a plurality of media servers under a control of a management server including: requesting a client change, from a first client connected to a first media server, to a second client to be connected to a second media server; generating a mirror session for the second client according to the request for the client change; and stopping a session for the first client.

In some embodiments, the methods may further include initializing the management server before requesting the client change.

In other embodiments, the initializing of the management server may include: making conference information on the videoconference; and analyzing an ID of an attendee of the videoconference and determining whether two or more clients have been registered for the attendee.

In still other embodiments, the methods may further include, when it is determined that two or more clients have been registered for the attendee: transmitting a handover user interface (UI) activation signal to the first client which the ID has accessed; and transmitting information on a list of the two or more clients to the management server.

In even other embodiments, in response to the handover UI activation signal, the IP of the second client may be selected from the list of two or more clients.

In yet other embodiments, the IP of the second client selected may be selected by the attendee which has accessed the first client, or automatically selected by the management server.

In further embodiments, the conference information may be generated based on user data transmitted from the clients to the management server and may include a user ID of the attendee, a client IP, the address of a source media server, and address information on a destination media server.

In still further embodiments, the methods may further include transmitting a permission signal and information on available media servers to the first client which the attendee has accessed.

In even further embodiments, the methods may further include transmitting the address of the source media server and address information on the destination media server to the first media server.

In yet further embodiments, the generating of the mirror session may include: transmitting, a ready signal representing that media data is ready for transmission from the second client to a destination media server, to the management server; and delaying the transmission of the media data from the second media server to the destination media server until a preparation for the client change is completed.

In much further embodiments, the methods may further include, after the generating of the mirror session: transmitting, a change acknowledgment signal representing that the preparation for the client change has been completed, to the first client; transmitting a first acknowledgment signal to the management server in response to the change acknowledgment signal; and transmitting, a second acknowledgment signal allowing the media data to be transmitted from the second media server to the destination media server, to the second media server.

In still much further embodiments, the methods may further include: transmitting a first stop signal to the first client in response to an acknowledgment signal to the management server; and transmitting a second stop signal to the first media server.

In even much further embodiments, the first client may stop transmitting the media data to the first media server in response to the first stop signal, and the first media server may delete a table stored in the media server in response to the second stop signal.

In yet much further embodiments, the methods may further include transmitting the media data from the second media server to the destination media server simultaneously with stopping transmitting the media data to the first media server.

In yet much further embodiments, the table may include the address of the first media server, address information on the destination media server, and media information on the media data.

In other embodiments of the present invention, systems for supporting a videoconference between clients through a plurality of media servers under the control of a management server include: a plurality of media servers connected to the clients and configured to transmit media data on the clients; and a management server configured to receive a request for a client change from a first client of the clients, and to generate a mirror session for a second client to be changed according to the request for the client change.

In some embodiments, the management server may delay the transmission of the media data from the second media server to a destination media server until a preparation for the client change is completed.

In other embodiments, the address of the second media server for generating the mirror session may be selected with reference to user data transmitted from the management server to the second media server.

In still other embodiments, the user data may include a user ID of an attendee who has accessed the first client, the IP of the second client, the address of the first media server, and address information on the second media server.

In even other embodiments, a session for the first client may stop and the media data may be transmitted from the second media server to the destination media server, when the preparation for the client change is completed.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
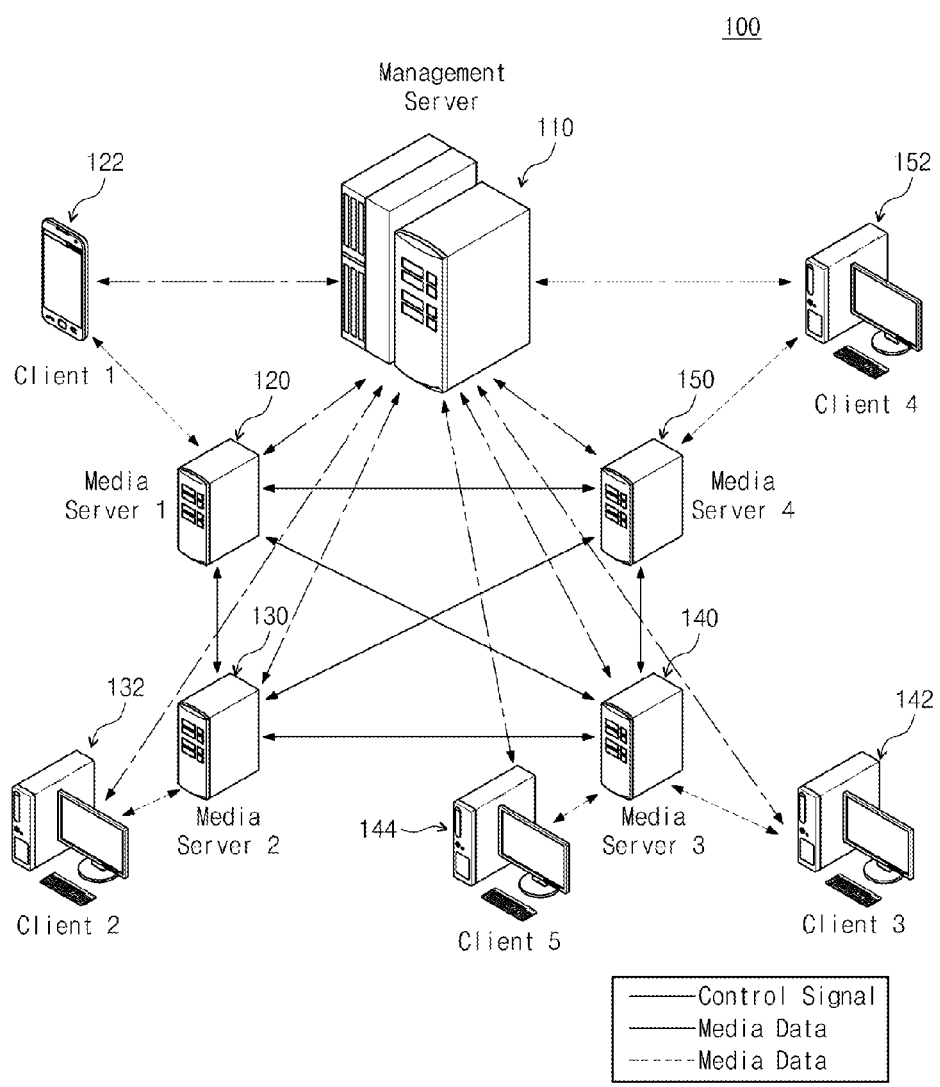
FIG. 1 shows a distributed telepresence system according to an embodiment of the present invention.

It should be understood that both the foregoing general description and the following detailed description are exemplary, and it should be appreciated that the additional description of the claimed invention is provided. Reference numerals are indicated in the exemplary embodiments of the present invention and their examples are indicated in the accompanying drawings. The same reference numerals are used in the description and drawings in order to refer to the same or similar parts wherever possible.

In the following, a method and system for supporting a videoconference in a distributed telepresence platform is used as an example of explaining the characteristic and function of the present invention. However, a person skilled in the art will be able to easily understand other advantages and performance of the present invention based on the details described herein. Also, the present invention will be able to be implemented or applied through other embodiments. In addition, the detailed description may be modified or changed according to a viewpoint and an application without departing significantly from the scope, technical spirit and other purposes of the present invention.

Even though the terms a "first" and a "second" may be used for explaining various components, these components are not limited by these terms. The terms may only be used to distinguish one component from others. The term "include," "comprise," "including," or "comprising," used in the detailed description of the present invention specifies a characteristic, a step, an operation, an ingredient, and/or a component but does not exclude another or more characteristics, steps, operations, ingredients, components, and/or their groups. In the description of embodiments, it will be understood that when a layer is referred to as being "on/ under" another layer or substrate, it can be directly on the other layer or substrate, or intervening layers may also be present. It will be understood that when an element or a layer is referred to as being "connected to", "coupled to", or "adjoining" another element or layer, it can be connected to, coupled to or adjoin the other layer directly, or intervening elements or layers may also be present.

Embodiments of the present invention are described below with reference to the accompanying drawings so that a person skilled in the art may easily accomplish the technical spirits of the present invention.

FIG. 1 shows a distributed telepresence system according to an embodiment of the present invention. A distributed telepresence system 100 may include a management server 110, a plurality of media servers 120 to 150, and a plurality of clients 122, 132, 142, 144 and 152. Although FIG. 1 shows four media servers and five clients, it is possible to include less or more components.

The management server 110 may be connected to the plurality of clients which attendees of a videoconference access, and the plurality of media servers that are connected one another to connect the clients one another, to control overall operations needed for performing the conference.

For example, after the conference starts, the management server 110 may receive user data from each of the clients each time each user attend the conference. The user data may include a user ID of a conference attendee, a client IP, an address of a source media server, and address information on a destination media server.

Each time each user attends the conference, user data transmitted to the management server 110 is stored in the management server 110 in a tabular format. In this example, the source media server indicates a media server (such as a media server 1) transmitting media data generated in a videoconference. In addition, the destination server indicates media servers (such as media server 1 and media server 2) receiving the media data. In FIG. 1, media server 2 and client 2 are used for a mirror session generated by request of client 1 and related descriptions will be provided in detail in FIG. 3.

In addition, the management server 110 permits client 1 to attend a conference and transmits information on media server 1 (such as IP of a media server) that client 1 having attended the conference may use. Accordingly, client 1 may perform a videoconference with other clients through media server 1.

The management server 110 may transmit the address of a source media server and address information on a destination media server to media server 1 connected to client 1 which the user having just attended the conference accesses. The information is stored in media server 1 in a tabular format until a session ends.

In a distributed telepresence platform, media data (such as a video packet and an audio packet) generated in a conference is transmitted and received only between media servers. For example, when client 1 attempts to transmit media data, it first transmits the media data to media server 1. In addition, media server 1 transmits received media data to media servers (such as media servers 3 and 4) connected to clients (such as clients 3 to 5) which conference attendees have accessed. Then, each of media servers 3 and 4 transmits media data to clients 3 to 5 connected thereto. As clients 3 and 5 are connected to media server 3 in FIG. 1, a plurality of clients may be connected to one media server. In this case, the number of the plurality of clients may be set or controlled by a management server not to exceed the data transmission and reception capacity of a media server connected to the clients.

Since media data in a videoconference in a distributed telepresence platform is transmitted and received through a plurality of media servers and not a main server, there is an advantage in that it is possible to decrease system overload due to an excess of traffic. In addition, since a videoconference is performed by using software without an expensive main server, there is an advantage in that it is possible to decrease costs.

Figure 2:
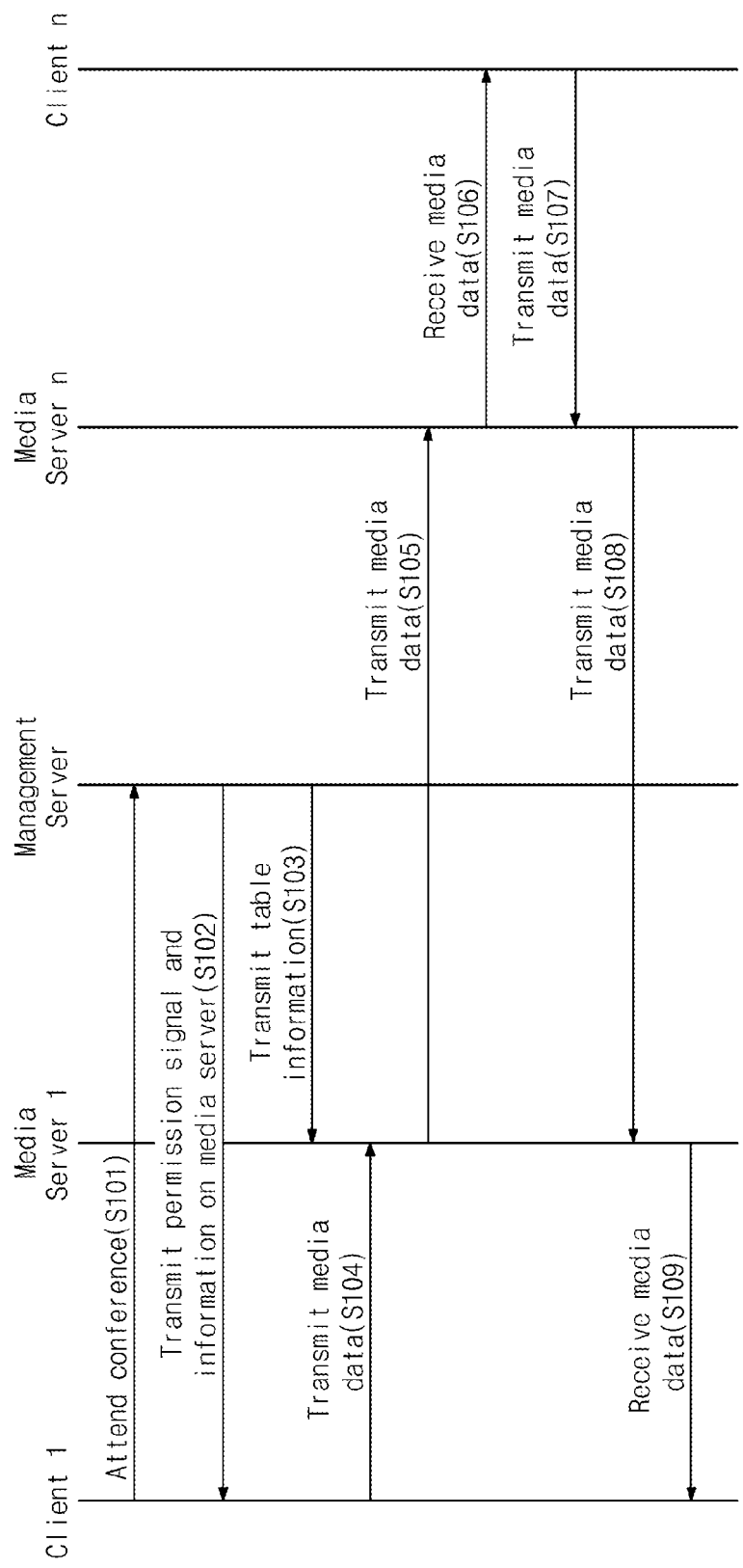
FIG. 2 shows a data flow during a videoconference in a distributed telepresence platform according to an embodiment of the present invention.

FIG. 2 shows a data flow during a videoconference in a distributed telepresence platform according to an embodiment of the present invention.

Referring to FIG. 2, a user requests conference attendance through client 1 in step S101. It is understood that a user logs in to attend the conference. In this case, user data including a user ID of a conference attendee, a client IP, the address of a source media server, and address information on a destination media server is transmitted to a management server as described previously. Thus, the management server transmits, to client 1, an attendance permission signal and information on a media server (such as IP of media server 1) that client 1 may use, in step S102. In addition, the management server transmits, to media server 1, the address of a source media server and address information on a destination media server. Accordingly, a session for client 1 is generated and the information is stored in media server 1 in a tabular format until the session ends, in step S103.

In addition, media data generated with the conference is first transmitted to the media server in steps 104 and S107, and the transmission and reception of the media data is performed between media servers in steps S105 and S108. In addition, the media data transmitted from an opposite media server (i.e., a source media server) to a destination media server is transmitted to a client in steps S106 and S109.

In a distributed telepresence platform, since the management server only controls overall operations of a videoconference and media data (such as video packets and audio packets) generated in a conference is transmitted and received between media servers, there is an advantage in that it is possible to reduce system overload. That, it is possible to efficiently perform the videoconference by using software without an expensive main server.

Figure 3:
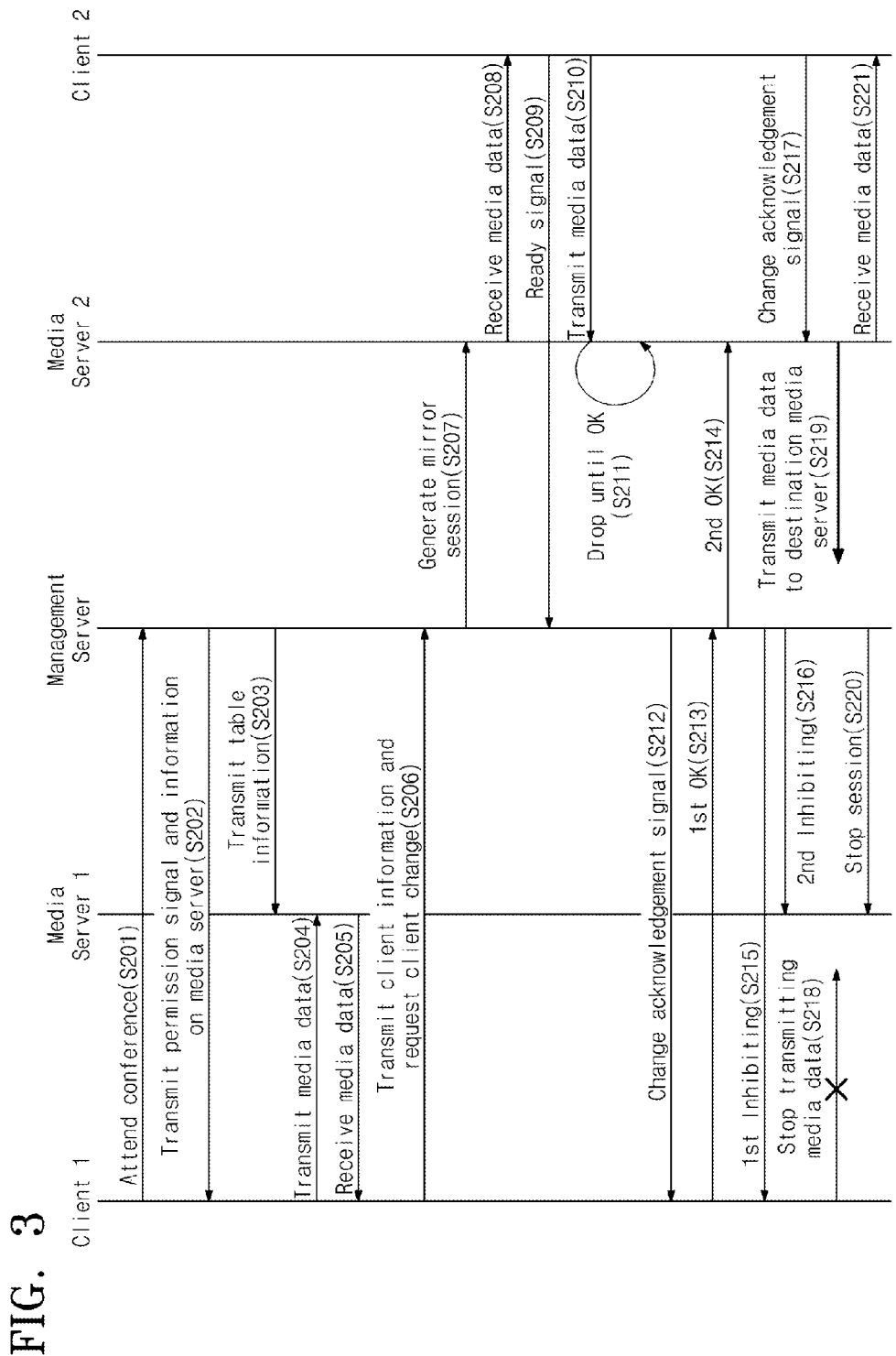
FIG. 3 shows a data flow when handover occurs during a videoconference in a distributed telepresence platform according to an embodiment of the present invention.

FIG. 3 shows a data flow when handover occurs during a videoconference in a distributed telepresence platform according to an embodiment of the present invention.

In step S201, a user attempts to attend a conference through client 1. In this case, client 1 transmits user data to a management server. The user data includes a user ID of a conference attendee, a client IP, the address of a source media server, and address information on a destination media server.

In addition, the management server uses received user data a previously built database (DB) to initialize the management server. The DB may be built by using data collected through membership subscription before the conference or by using information collected through the previous conference. Information accumulated in the DB may include the user ID and information on a wireless or wire client which the user has accessed.

In step S202, the management server transmits, to client 1, an attendance permission signal and information on a media server (such as IP of media server 1) that client 1 may use. In addition, the management server analyzes the user ID of a conference attendee to determine whether two or more clients have been registered. That is, it is determined with reference to the DB whether a user has accessed by using a plurality of clients in the previous conference. When it is determined that a plurality of clients have been registered for the attendee, a handover user interface (UI) activation signal is transmitted to client 1. In addition, client list information on conference attendees is also transmitted.

In this case, client 1 displays a handover window on the screen of a user. For example, a user having accessed through client 1 may be a user who has attended the conference through a wireless terminal such as a smart phone or a computer terminal connected to wire communication. The handover window may be activated on a display which a conference attendee uses and on which conference information is displayed. The handover window means a window displaying clients to perform a handover operation that changes a client through the arbitrary operation by a conference attendee.

In step S203, the management server transmits, to media server 1, the address of a source media server and address information on a destination media server. Accordingly, a session for client 1 is generated and the information is stored in media server 1 in a tabular format until the session ends.

The transmission and reception process of media data in steps S204 and 205 is the same as that described in FIG. 2 above.

In step S206, a user having attended the conference through client 1 may request a client change and transmit information on a client to be changed to the management server. In this example, the client change may mean that a user arbitrarily changes a plurality of clients indicated on the handover window displayed on the display of the terminal (such as a smart phone or a computer) of a conference attendee, as described above. Alternatively, in a case where a user attends the conference by using mobile communication such as a smart phone, the client may be automatically changed when the smart phone of the conference attendee gets out of a cell boundary of a corresponding base station and moves to a cell boundary of an adjacent base station.

The conference attendee may arbitrarily select one of clients displayed on the handover window for convenience. Clients displayed on the handover window are those used when the conference attendee has attended the previous conference. For example, assume that an attendee having attended the conference by using his or her smart phone on the way to work has arrived work and then he wants to continue to attend the conference through his or her computer. In this case, the conference attendee boots his or her computer after the arrival to work and then selects a client corresponding to his or her computer in the company among clients displayed on the handover window activated on the display of the smart phone to be capable of attending the conference seamlessly. Alternatively, it may equally applied to a case where the conference attendee has attended the conference by using a computer in the office and then he or she wants to attend the conference seamlessly by using his or her smart phone on the way to home.

In step S207, the management server receiving a request for the client change from the conference attendee may generate a mirror session for a new client (such as client 2). The mirror session is generated for a client to be changed (such as client 2) and performs the operation of generating a virtual attendee (the same user ID and the IP of the client to be changed). The mirror session may co-exist with an existing session for client 1 for a certain time in order to seamlessly provide a conference.

In addition, the management server may transmit, to media server 2, the address of a source media server and address information on a destination media server. The information is stored in media server 2 in a tabular format until the mirror session ends.

In step S208, client 2 may receive media data from media server 2. Although not shown, client 1 receives media data from media server 1 simultaneously. That is, the number of the destination media servers receiving media data from the source media server for the same user ID is two (media servers 1 and 2).

In step S209, client 2 transmits a ready signal to the management server. The ready signal is a kind of signal providing a notice that client 2 receiving media data is in a state in which media data may be normally transmitted and received.

In step S210, client 2 transmits media data to media server 2. Although not shown, client 1 transmits media data to media server 1 simultaneously. That is, the number of source media servers providing media data is two (media servers 1 and 2). However, form a point of view of destination media servers receiving media data (e.g., remaining media servers other then media servers 1 and 2 receiving media data), there are two same data values for the same user ID and thus a collision occurs.

Thus, in step S211, media server 2 stands by without transmitting media data received from client 2 to other media servers (i.e., remaining destination media servers other than media server 1). Standby may last until a session for client 1 closes and thus media server 1 may no longer transmit media data.

In step S212, the management server transmits a change acknowledgment signal to media server 1. The change acknowledgment signal is a signal providing a notice that a preparation for a change from client 1 to client 2 has been completed.

In step S213, client 1 receiving the change acknowledgment signal transmits a first acknowledgment signal to the management server. As a result, the management server recognizes that it is possible to change from client 1 to client 2.

In step S214, the management server transmits a second acknowledgment signal to media server 2. As a result, media server 2 recognizes that it is possible to change from client 1 to client 2.

In step S214, the management server transmits a first inhibition signal to media server 1. The first inhibition signal is a signal that allows client 1 to stop transmitting media data to media server 1.

In step S216, the management server transmits the first inhibition signal and transmits a second inhibition signal to media server 1 simultaneously. The second inhibition signal is a signal that allows the address of a source media server and address information on a destination media server stored in media server 2 to be deleted.

In step S218, client 1 receiving the first inhibition signal stops transmitting media data.

In step S219, media server 2 transmits media data to destination media servers (remaining servers other than media server 1). In order to seamlessly provide a videoconference, stopping the transmission of media data by client 1 may occur simultaneously with transmitting media data by media server 2. In addition, transmitting media data by client 2 in step S217 and receiving media data in step S221 represents that there is continuous media data transmission and reception between media server 2 and client 2 irrespective of the stop of a session for client 1. That is, media server 2 functions as a destination media server simultaneously with the generation of the mirror session in step S207 and functions as a source media server by the stop of media data transmission from client 1 in step S218 and media data transmission from media server 2 in step S219.

In step S220, the management server stops an existing session for client 1 and recognizes that the mirror session is a session that the conference attendee has attended.

According to the present invention, it is possible to provide a handover method for performing a videoconference seamlessly during the videoconference in a distributed telepresence platform.

Figure 4:
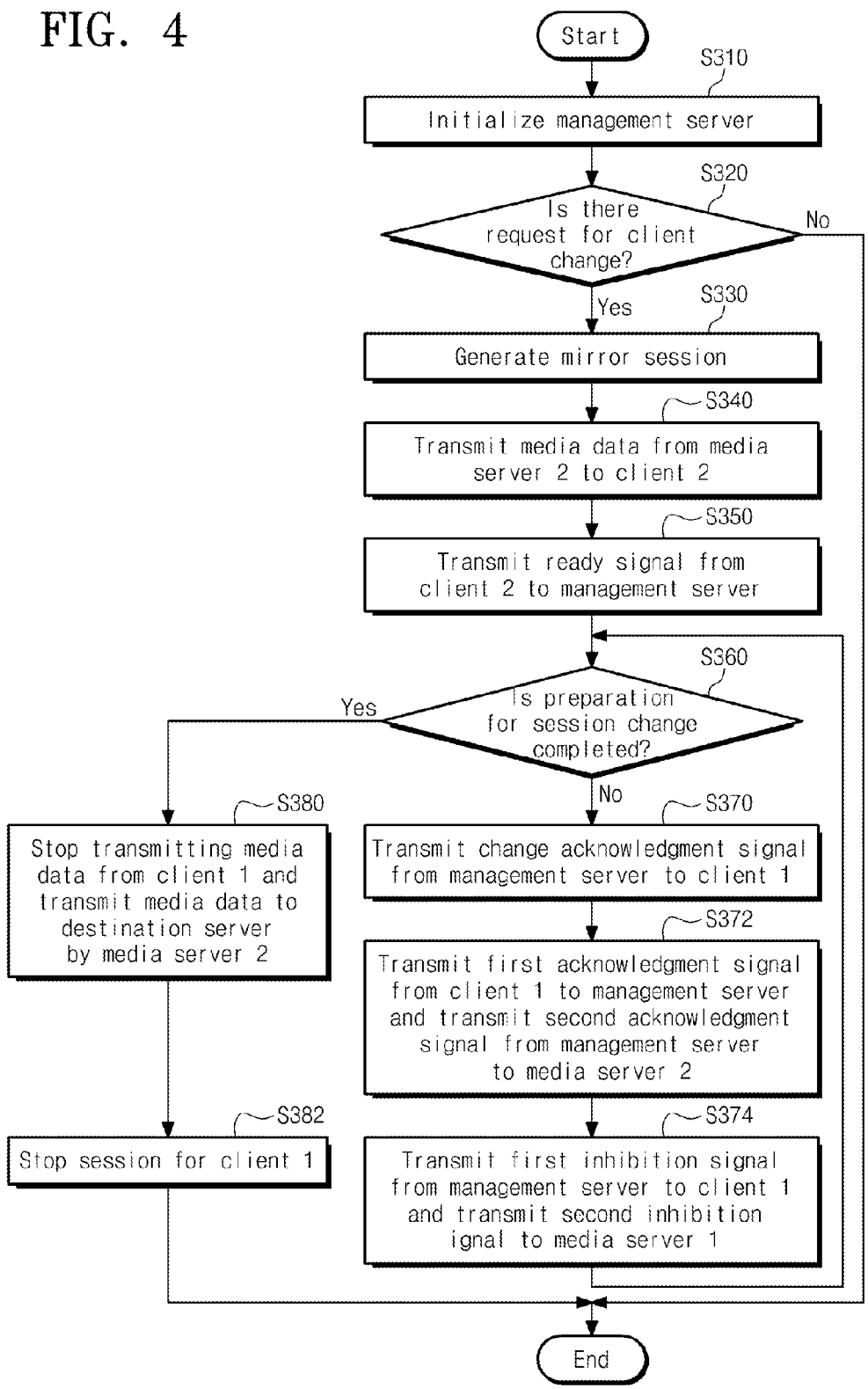
FIG. 4 is a flow chart of a method of performing handover during a videoconference in a distributed telepresence platform according to an embodiment of the present invention.
Figure 5:
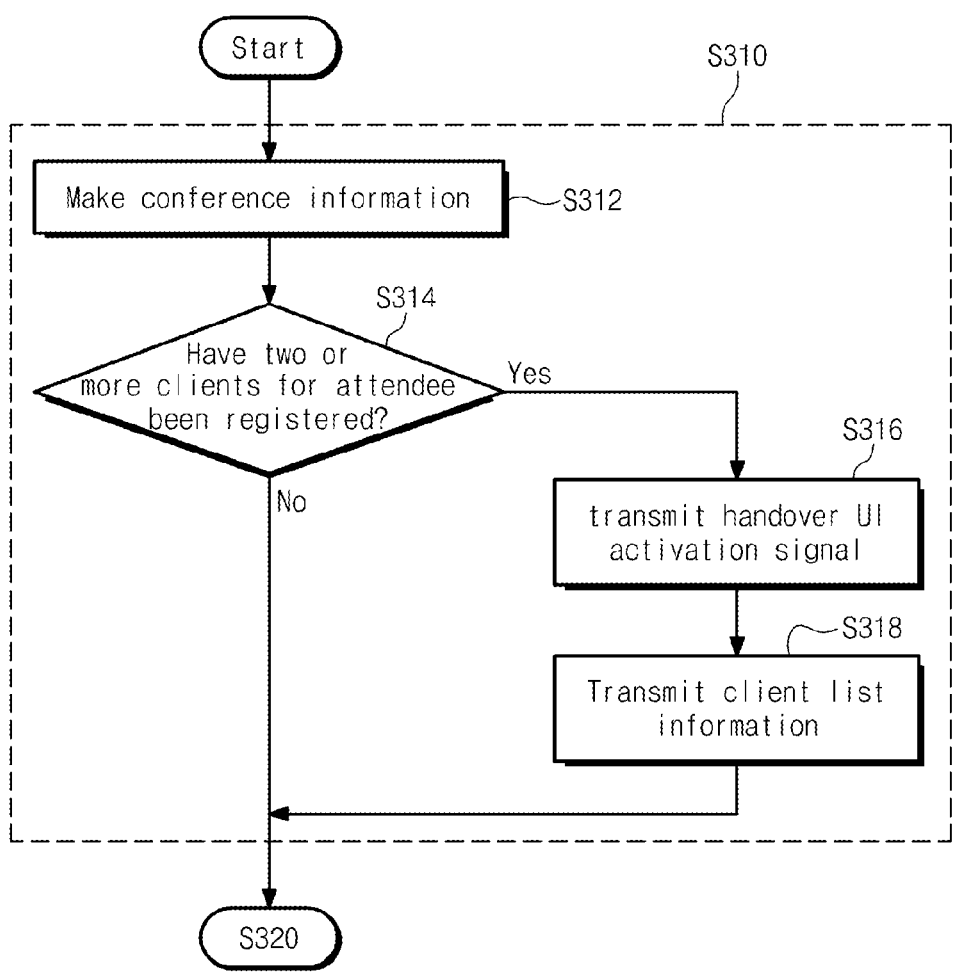
FIG. 5 is a flow chart of a method of initializing a management server in a videoconference in a distributed telepresence platform according to an embodiment of the present invention.

FIG. 4 is a flow chart of a method of performing handover during a videoconference in a distributed telepresence platform according to an embodiment of the present invention. FIG. 5 is a flow chart of a method of initializing a management server in a videoconference in a distributed telepresence platform according to an embodiment of the present invention.

As in FIG. 3, assume that a conference attendee has attended a conference through client 1 which has accessed media server 1 and there is handover to client 2 to be connected to media server 2.

Referring to FIGS. 4 and 5, the management server is initialized in step S310. A DB may be built by using data collected through membership subscription before the conference or by using information collected through the previous conference. Information accumulated in the DB may include a user ID and information on a wireless or wire client which a user has accessed.

In step S312, conference information is stored. The conference information may be generated based on user data transmitted from a client, which the conference attendee has accessed, to the management server, or information accumulated in the DB. The user data may include a user ID of the conference attendee, a client IP, the address of a source media server, and address information on a destination media server. In step S314, the management server analyzes the user ID of the conference attendee to determine whether two or more clients have been registered. That is, it is determined with reference to the DB whether a user has accessed by using a plurality of clients in the previous conference. According to a determination result, the following operation is determined. When two or more clients have not been registered for the attendee (No in step S314), the method proceeds to step S320. In this case, a list of clients capable of performing handover is not displayed on the display of the terminal of the conference attendee. The reason is because the client which the conference attendee has currently accessed is a unique client which the current attendee has accessed so far. However, even though there is no list of handover, it is possible to request handover through other terminals (such as a smart phone or computer). When two or more clients have been registered for the attendee (Yes in step S314), the method proceeds to step S316.

In step S316, the management server transmits a handover UI activation signal to client 1.

Client 1 receiving the handover UI activation signal is ready for activating a handover window on the display of the terminal (such as a smart phone or computer) of the conference attendee.

In step S318, the management server transmits a list of clients to client 1. The reason is to display, on the display of the terminal (such as a smart phone or computer) of the conference attendee, the list of clients which the conference attendee has accessed previously so that the attendee may select a client to which handover is performed.

In step S320, it is determined whether there has been a request for a client change. As described above, the client change may mean that a user arbitrarily changes a plurality of clients indicated on the handover window displayed on the display of the terminal (such as a smart phone or a computer) of the conference attendee. According to a determination result, the following operation is determined. When there is no request for the change (No in step S320), the procedure ends. It means that the conference attendee continue to perform the conference through the original client without the client change. When there is the request for the client change (Yes in step S320), the procedure proceeds to step S330. In step S330, the mirror session is generated. The mirror session performs the operation of generating a virtual attendee (the same user ID and the IP of the client to be changed) different from the conference attendee through client 1. The mirror session may co-exist with an existing session for client 1 for a certain time in order to provide a seamless conference.

In step S340, media server 2 transmits media data to client 2. In this case, client simultaneously receives the same media data from media server 1. That is, there are two destination media servers receiving media data, for the same user ID.

In step S350, client 2 transmits a ready signal to the management server. The ready signal is a signal providing a notice that client 2 receiving media data is in a state in which media data may normally be transmitted and received.

In step S360, it is determined whether a preparation for the change of a session has been completed. According to a determination result, the following operation is determined. The fact that the preparation for the change of a session has been completed means that client 1 is ready for stopping transmitting media data to media server 1 and media server 2 is ready for transmitting media data to destination media servers. When there is no preparation for the change of the session (No in step S360), the procedure proceeds to step S370. When there is the preparation for the change of the session (Yes in step S360), the procedure proceeds to step S380. Immediately after the mirror session has been generated, the procedure proceeds to step S370 because a signal that the preparation has been completed is not yet received from client 1.

In step S370, the management server transmits a change acknowledgment signal to client 1. The change acknowledgment signal is a signal providing a notice that a preparation for a change from client 1 to client 2 has been completed.

In step S372, client 1 transmits the first acknowledgment signal to the management server which then transmits a second acknowledgment signal to media server 2 in response to the first acknowledgment signal. Thus, the management server and media server 2 recognize that it is possible to change a session.

In step S374, the management server transmits a first prohibition signal and a second prohibition signal to client 1 and media server 1, respectively. The first prohibition signal is a signal that allows client 1 to stop transmitting media data to a media server. The second prohibition signal is a signal that allows address information on a source media server and a destination media server stored in a media server to be deleted. In addition, it is re-determined whether a preparation for the change of a session has been completed in step S360. In this case, since the management server has already received from client 1 the first acknowledgement signal representing that it is possible to change a session, the preparation for the change of the session has been completed (Yes in step S360).

In step S380, client 1 stops transmitting media data to media server 1. Simultaneously, media server 2 transmits media data to a destination media server (i.e., remaining media servers other then media server 1 and media server 2).

In step S382, the management server stops an initially set session and recognizes that the mirror session is the session which the conference attendee has attended.

According to the present invention, it is possible to provide a handover method for performing a videoconference seamlessly during the videoconference in a distributed telepresence platform.

It is obvious to a person skilled in the art that the structure of the present invention may be variously modified or changed without departing from the scope or technical spirit of the present invention. When considering the descriptions above, it is considered that the present invention includes changes and modifications of the present invention if they are within the scopes of the following claims and their equivalents.

According to the present invention, it is possible to provide a videoconference seamlessly even if handover occurs during the videoconference in a distributed telepresence platform.

What is claimed is:

1. A method of supporting a videoconference between clients through a plurality of media servers under control of a management server, the method comprising:
   generating, for a videoconference, a session between a first client and a first media server for communicating media data therebetween;
   initializing the management server, which includes:
      making conference information on the videoconference; and
      analyzing an ID of an attendee of the videoconference and determining whether two or more clients have been registered for the attendee;
   requesting a client change, from the first client connected to the first media server, to a second client to be connected to a second media server; and
   in response to the request, generating, for the videoconference, a mirror session between the second client and the second media server for communicating the media data; and
   stopping the session for the first client after the mirror session is generated.

2. The method of claim 1, further comprising, upon determining that two or more clients have been registered for the attendee:
   transmitting a handover user interface (UI) activation signal to the first client which the ID has accessed; and
   transmitting information on a list of the two or more clients to the management server.

3. The method of claim 2, wherein in response to the handover UI activation signal, the IP of the second client is selected from the list of two or more clients.

4. The method of claim 3, wherein the IP of the second client selected is selected by the attendee which has accessed the first client, or automatically selected by the management server.

5. The method of claim 2, wherein the conference information is generated based on user data transmitted from the clients to the management server and comprises a user ID of the attendee, a client IP, the address of a source media server, and address information on a destination media server.

6. The method of claim 2, further comprising transmitting a permission signal and information on available media servers to the first client which the attendee has accessed.

7. The method of claim 6, further comprising transmitting the address of the source media server and address information on the destination media server to the first media server.

8. The method of claim 2, wherein the generating of the mirror session comprises:
   transmitting, a ready signal representing that media data is ready for transmission from the second client to a destination media server, to the management server; and
   delaying the transmission of the media data from the second media server to the destination media server until a preparation for the client change is completed.

9. The method of claim 8, further comprising, after the generating of the mirror session:
   transmitting, a change acknowledgment signal representing that the preparation for the client change has been completed, to the first client;
   transmitting a first acknowledgment signal to the management server in response to the change acknowledgment signal; and
   transmitting, a second acknowledgment signal allowing the media data to be transmitted from the second media server to the destination media server, to the second media server.

10. The method of claim 9, further comprising: transmitting a first stop signal to the first client in response to an acknowledgment signal to the management server; and transmitting a second stop signal to the first media server.

11. The method of claim 10, wherein the first client stops transmitting the media data to the first media server in response to the first stop signal, and the first media server deletes a table stored in the media server in response to the second stop signal.

12. The method of claim 11, further comprising transmitting the media data from the second media server to the destination media server simultaneously with stopping transmitting the media data to the first media server.

13. The method of claim 12, wherein the table comprise the address of the first media server, address information on the destination media server, and media information on the media data.

* * * * *